United States Patent Office 3,060,084
Patented Oct. 23, 1962

3,060,084
IMPROVED HOMOGENEOUS, READILY DISPERSED, PESTICIDAL CONCENTRATE
Clarence A. Littler, Wilmington, Del., assignor to E. I. du Pont de Nemours and Company, Wilmington, Del., a corporation of Delaware
No Drawing. Filed June 9, 1961, Ser. No. 115,895
2 Claims. (Cl. 167—42)

This invention relates to novel aqueous fluid pesticidal concentrates. It is more particularly directed to pesticidal concentrates comprising a water-insoluble pesticide, water, a polycarboxylated hydrocarbon polymer and a dispersing agent, which concentrates have been subjected to high shear to give them their desired physical properties.

It is desirable that liquid pesticide concentrates be homogeneous. It is also desirable that the solid components of these concentrates should not settle out during storage, but the concentrates should also be fluid enough so that they can be easily poured. The concentrate must also be easily diluted so that they can be readied for application with a minimum of effort.

When the active ingredient in such concentrates is water- or oil-soluble, there of course is no problem since the active can be formulated as a true aqueous solution or as an oil preparation. But when the active ingredient is insoluble, many problems stand in the way of preparing a concentrate having all these desirable physical properties.

For example, by judiciously selecting a suspending agent, it is possible to formulate a concentrate which is homogeneous and viscous enough to prevent the solid particles from settling out, but such a preparation obviously is not fluid enough for easy pouring, nor is it easily diluted. Moreover, such suspensions become flocculent when diluted and the pesticide particles settle out rapidly as aggregates.

Similarly, by proper selection of a dispersing agent, it is possible to prepare a concentrate of a finely divided pesticide which is highly dispersed and which remains highly dispersed on dilution. Such a concentrate can be easily poured and diluted, but unfortunately the particles slowly settle to form a dense cake at the bottom of the container.

A solution to the problem would appear to be a combination of suspending agent and dispersing agent. But this is impractical for at least two reasons. First, the flocculating action of many suspending agents is unaffected by dispersants and so the concentrates would settle out anyway. Secondly, suspending agents are adversely affected by dispersants. Most suspending agents have lower suspending powers in the presence of dispersants; some lose their thickening action entirely. To overcome this, it would be necessary to raise the viscosity of a concentrate to an undesirable point.

It has now been found, according to this invention, that a concentrate of a water-insoluble pesticide, having all of the aforementioned advantages, can be prepared by combining the water-insoluble pesticide with a polycarboxylated hydrocarbon polymer suspending agent, a carefully selected dispersing agent, and then subjecting this combination to high shear. The shear reduces the viscosity of the preparation and makes it more pourable and more easily diluted. It also minimizes the preparation's tendency to flocculate on dilution. Surprisingly and unexpectedly, however, this reduction in viscosity leaves the suspending powers of the polymer unaffected.

The resulting product is a stable concentrate which resists settling, even on dilution, but which is still liquid enough to be easily poured and diluted without leaving a film on the container wall. In addition, many of the concentrates of this invention are freeze-stable, that is, they are highly dispersible even after being frozen and thawed.

The factor responsible for this unusual combination of properties is not known, but it is believed to be the slight and critical degree of thixotropy in the concentrates. The concentrates have a thixotropy factor of $F = \eta 6/\eta 30 = 1.2$ to 5.0 where $\eta 6$ and $\eta 30$ are the viscosities measured by a Brookfield viscosimeter, using a No. 1 spindle rotating at 6 and 30 r.p.m., respectively.

The viscosities of the concentrates can range from 100 to 2000 cps.

The dispersant used in the compositions of this invention can be any of the materials well known to act as dispersants for finely divided solids in water. Illustrative of such materials are:

Low viscosity methylcellulose, such as "Methocel" 15 (Dow Chemical Co.)
Water-soluble, low-viscosity, partially hydrolyzed polyvinyl alcohol, such as "Elvanol" Polyvinyl Alcohol 51–05 (E. I. du Pont de Nemours and Co.)
Polyoxyethylene sorbitan esters of mixed fatty acid rosin acids, such as "G-8916P" (Atlas Powder Co.)
Purified sodium lignin sulfonates such as "Marasperse" (Marathon Paper Co.), "Palconate" (Pacific Lumber Co.), and "Polyfon" (West Virginia Pulp and Paper Co.)
Sodium salts of polymerized alkaryl and aryl alkyl sulfonic acids, such as "Daxad" (Dewey and Almy Co.), "Lomar" (Jaques Wolf and Co.), and "Darvan" (Vanderbilt Co.)
Methyl hydroxyethyl cellulose
Carboxymethyl cellulose These dispersing agents generally are present in the compositions of this invention in proportions of from 0.4% to 25% by weight. The precise amount to be used will, of course, depend on the nature of the concentrate desired, and so it is not possible to give a precise amount. For most purposes, however, concentrations of between 0.5% and 5% will be satisfactory.

The suspending agents used in the compositions of this invention are polycarboxylated hydrocarbon polymers whose carboxyl groups are in the form of an alkali metal, ammonium or amine salts. The molecular weight of such polymers ranges from 30,000 to 200,000. The polymers should have neutralization equivalents of from 71–400, expressed as grams of dry polymer neutralized by one equivalent of sodium or potassium hydroxide.

Typical of such polymers are the salts of polyacrylic and polymethacrylic acids; by this is meant the free acids and polymers which are hydrolyzable to free acids, which have been hydrolyzed to a substantial degree.

Although it is by no means the only one which can be used, an especially suitable polymer for use in the compositions of this invention is one made and sold by the B. F. Goodrich Company under the trade name "Carbopol" 934. The precise chemical nature of this polymer is not known, but according to the best available information, it is believed to be substantially polyacrylic acid. A 1% solution of this material has a neutralization equivalent of 14.2 milliequivalents of strong base per gram. The viscosity at 25° C. after neutralization with sodium hydroxide and using a Brookfield viscosimeter model MV at 20 r.p.m. (with the lowest numbered spindle that gives a scale reading) is 10,000 cps. for a 0.5% solution of neutralized "Carbopol," 30,000 cps. for a 1% dispersion, 50,000 cps. for a 2% dispersion and 70,000 cps. for a 3% dispersion Of course, any polymer which has the same or similar physical and chemical characteristics and which acts similarly when sheared in contact with water, a dispersing agent and a pesticide will be satisfactory for use in this invention.

A suspending agent similar to "Carbopol" which has been found satisfactory for use is an acid containing cross-linked acrylic emulsion copolymer sold by Rohm and Haas Company under the name "Acrysol" ASE60. This product has a solids content of 28%, an initial pH of 3.5 and specific gravity of 1.054 at 20° C. A 1% solution has a viscosity of 3,000 cps., and a 5% sodium salt solution has a viscosity of 25,000 cps., as measured by a Brookfield viscosimeter at 12 r.p.m. The neutralization equivalent weight is 218.

A similar product also satisfactory for use is "Acrysol" ASE75, produced by the Rohm and Haas Company. This polymer is not cross-linked, has 40% solids, an initial pH of 3 and a specific gravity of 1.08. Its neutralization equivalent is 266.

The polycarboxylated hydrocarbon polymer is ordinarily used in a proportion of from 0.01% to 3%. More or less than this amount can be used when the active ingredients have unusual properties, or in other out-of-the-ordinary situations. Normally, however, use of less or more than this amount will give a concentrate with undesirable viscosity characteristics.

The concentrates can also contain such optional ingredients as corrosion inhibitors, antifoam agents, freezing-point depressants, compounds which inhibit the growth of microorganisms and thus ward off spoilage, dyes and pigments, and inert diluents. For some applications, it is desirable to add a "sticker" which acts as an adhesive and also makes the compositions more weather-resistant after application. The nature and precise amount of such adjuvants to be used will be well within the knowledge of one skilled in the art and will, of course, depend upon the problem which this ingredient is to solve.

Generally speaking, the nature of the active ingredient in the compositions of this invention is not critical. It is necessary only that the pesticide be water-insoluble and brittle enough at 4–5° C. to be wet-grindable. By "water-insoluble" is meant a pesticide which has a water solubility of less than 0.1% at 30° C.

The term "pesticide" embraces herbicides, fungacides, nematocides, insecticides, miticides, bactericides, dodenticides, anthelmintics, pest repellants, and the like.

Illustrative of suitable pesticides for use in the compositions of this invention are the following.

Herbicides:
  Monuron
  Diuron
  Neburon
  3-(3,4-dichlorophenyl)-1-methoxy-1-methylurea
  2,4-dichlorophenoxyacetic acid
  2,4,5-trichlorophenoxyacetic acid
  2,3,6-trichlorobenzoic acid
  2-chloro-4,6-bis(ethylamino)-s-triazine
  2-chloro-4-isopropylamino-6-ethylamino-s-triazine
  2-methylmercapto-4-isopropylamino-6-ethylamino-s-triazine
  Tetrachloroterephthalic acid, dimethyl ester
  N,N-dimethyl-α,α-diphenylacetamide
Insecticides:
  Lead arsenate
  Methoxychlor
  DDT
  Lindane
Fungicides:
  Thiram
  Zinc dimethyldithiocarbamate
  Ferric dimethyldithiocarbamate
  Manganese ethylenebisdithiocarbamate
  Zinc ethylenebisdithiocarbamate
  Manganous dimethyldithiocarbamate
  3-(p-chlorophenyl)-5-methylrhodamine
  N - trichloromethylmercapto - 4 - cyclohexene - 1,2-dicarboximide
  Copper oxychloride
  Tribasic copper sulfate
  Copper oxide
  Ethyl mercury p-toluene sulfonanilide
  3,3'-ethylenebis(tetrahydro - 4,6 - dimethyl - 2H - 1,3,5-thiadiazine-2-thione)
Anthelimintics: Phenothiazine The proportion of pesticide to be used is largely a matter of choice and is limited only by practical considerations. If too high a proportion is used, the composition will be undesirably viscous. Too low a concentration is obviously undesirable for reasons of cost. Generally speaking, the addition of pesticides to the compositions of this invention in amounts of from 10% to 60% will be satisfactory, although in certain unusual circumstances, it may be that much lower or much higher concentrations are desirable. Compositions containing from 25–50% of pesticide are preferred.

The compositions of this invention can contain one active ingredient, or if unusual effects are desired, they can contain two or more ingredients in combination; for example, two herbicides can be combined to give synergistic effects, or insecticides can be combined with fungicides.

These aqueous concentrates are made by mixing the ingredients, in the proper amounts, with water and then subjecting this mixture to extremely high shear. Severe and extended milling is essential to obtain a composition with the desired physical properties. The desired shearing action can be obtained by milling the mixture in such equipment as ball mills, bead mills, or attritors. Especially suited for applying the requisite shear is a sand mill fully described in U.S. Patent No. 2,581,414.

The viscosity of the mixture before milling or shearing is normally in the range of from 30 to 30,000 cps. After milling or shearing, the composition should have a viscosity in the range of from 100 to 2000 cps., preferably 150–1000 cps., as measured with a Brookfield viscosimeter at 30 r.p.m.

The length of time the milling or shearing action should be continued to obtain the desired viscosity will naturally depend on many factors such as the nature of the active ingredient, the polycarboxylated hydrocarbon polymer and dispersing agent used, and the physical characteristics desired for the concentrate. Generally, the length of time the milling or shearing is continued can be determined best by inspection or measurement in a viscosimeter and by a determination of the particle size of the pesticide. Preferred compositions are those in which the particle size of the pesticide has been reduced to below 5 microns by milling.

The following examples are presented in order that this invention be better understood and more easily practiced:

*Example 1*

| | Percent |
|---|---|
| Thiram | 42.15 |
| "Carbopol" 934 | 0.30 |
| "Elvanol" polyvinyl alcohol 51–05 | 1 |
| Na$_2$HPO$_4$·7H$_2$O | 1 |
| 10% aqueous NaOH | .76 |
| Paisley's defoamer 630 (sulfated tallow) | .10 |
| Water | 54.69 |

The "Carbopol" and "Elvanol" polyvinyl alcohol are predissolved in 20% of the water. The alkali, disodium phosphate and defoamer are then added. Thiram and water are then added alternately, with constant stirring, to maintain a constant viscosity.

This premix is then mixed with 20–30 mesh Ottawa sand in a 1:1 ratio, by volume. The mixture is ground for 30 minutes and then centrifuged through a 40 mesh screen to remove the sand.

This composition is remarkably stable against settling. On addition to water to give a spray composition containing 1% of the active ingredient, the concentrate readily disperses in the water without flocculation to give a homogeneous mobile dispersion.

Example 2

| | Percent |
|---|---|
| Diuron | 42.5 |
| Atlas 8916P | 3 |
| "Carbopol" 934 | .25 |
| 10% aqueous NaOH | .70 |
| Paisley's defoamer 630 (sulfated tallow) | .20 |
| Water | 53.35 |

These ingredients are mixed and milled in a sand mill for 30 minutes. The mixture is then centrifuged through a 40 mesh screen to remove the sand.

The resulting product is a fluid suspension that can be easily diluted to give a highly dispersed herbicidal spray.

After the concentrate has been stored for 3 months, the herbicide particles remain in good suspension and the concentrate can be rendered uniform by mild stirring.

The thixotropy factor of the concentrate is 2.8.

Example 3

| | Percent |
|---|---|
| Thiram | 40.4 |
| "Acrysol" ASE75 (40% emulsion) | 1.25 |
| 10% aqueous NaOH | .679 |
| Atlas 8916P | 1.00 |
| Paisley's defoamer 630 | .2 |
| Water | 56.47 |

These ingredients are combined, mixed with sand in a ratio of 1:1 and then ground for 30 mintues. The sand is then centrifuged away from the concentrate, which contains a considerable amount of entrained air. After the concentrate has stood for 24 hours, however, most of this air has escaped.

The concentrate shows good freeze-stability. After being frozen and then thawed, the concentrate remains smooth and nongranular.

Example 4

| | Percent |
|---|---|
| Methoxychlor | 38.1 |
| "Carbopol" 934 | .25 |
| "Elvanol" polyvinyl alcohol 51–05 | 1.25 |
| 10% aqueous NaOH | .70 |
| Water | 59.7 |

The methoxychlor is first micropulverized with Dry Ice. All the ingredients are then combined. Three-hundred grams of this mixture are mixed with 400 ml. of sand and ground for 30 minutes. The sand is then separated by centrifuging.

Example 5

| | Percent |
|---|---|
| Thiram | 35.00 |
| Dieldrin (76% wettable powder) | 11.2 |
| "Elvanol" polyvinyl alcohol 51–05 | 1.2 |
| "Carbopol" 934 | .3 |
| 10% aqueous NaOH | .76 |
| Nopco 1947V defoamer | .10 |
| Water | 49.94 |

These ingredients are first mixed together with a paddle stirrer to give a thick uniform paste having a viscosity of 4800 cps. at 30 r.p.m. This paste is sand-milled for 30 minutes and then centrifuged to remove the sand. The final concentrate has a viscosity of 674 cps. at 30 r.p.m.

Example 6

| | Percent |
|---|---|
| Thiram | 51.03 |
| Atlas 8916P | 2.00 |
| Marasperse CB | 1.00 |
| "Acrysol" ASE75 | .75 |
| Paisley's defoamer 630 | .20 |
| Water | 45.02 |

These ingredients are mixed to give a composition having a putty-like consistency, which thins as stirring continues. When the mixture is homogeneous, it is sand-milled for about 30 minutes and then centrifuged to remove the sand.

Example 7

| | Percent |
|---|---|
| Neburon | 54.4 |
| "Carbopol" 934 | .22 |
| Atlas 8916P | 1.00 |
| Marasperse CB | 1.00 |
| $Na_2HPO_4$ | .75 |
| Nopco defoamer 1497V | .20 |
| Tetramethyl thiuram disulfide | .20 |
| Water | 42.23 |

These ingredients are mixed and agitated until the thick paste becomes fluid. The mixture is then sand ground for 30 minutes.

The concentrate is stable against settling. Even after freezing and thawing it remains smooth and flowable with no granulation and can be restored to its original viscosity by agitating it.

This application is a continuation-in-part of copending applications Serial Nos. 755,428, filed August 18, 1958, and 755,429, filed August 18, 1958, which, in turn, are continuations-in-part of application Serial No. 621,545, filed November 13, 1956, and now abandoned.

The embodiments of the invention in which an exclusive property or privilege is claimed are:

1. An aqueous pesticidal composition, said composition comprising from 10% to 60% of a water-insoluble pesticide; from 0.4% to 25% of a dispersing agent; and from 0.01% to 3% of a polycarboxylated hydrocarbon polymer having a molecular weight of from 30,000 to 200,000, a neutralization equivalent of from 71 to 400, and carboxyl groups in the form of salts whose cations are selected from the group consisting of alkali metals, ammonium and amine; said composition having a viscosity of from 100 to 2,000 cps. and a thixotropy factor F of from 1.2 to 5.0; the particles of said composition having average diameters of no more than 5 microns; said composition having had an initial viscosity of from 300 to 30,000 cps. and having been subjected to a high rate of shear to obtain the defined final rheological properties.

2. An aqueous pesticidal composition, said composition comprising from 40% to 45% of tetramethyl thiuram disulfide; from 0.75% to 1.25% of low viscosity polyvinyl alcohol; and from 0.25% to 0.35% of a polycarboxylated hydrocarbon polymer having a molecular weight of from 30,000 to 200,000, a neutralization equivalent of from 71 to 400, and carboxyl groups in the form of salts whose cations are selected from the group consisting of alkali metals, ammonium and amine; said composition having a viscosity of from 100 to 2,000 cps. and a thixotropy factor F of from 1.2 to 5.0; the particles of said composition having average diameters of no more than 5 microns; said composition having had an initial viscosity of the order of 30,000 cps. and having been subjected to a high rate of shear to obtain the defined final rheological properties.

References Cited in the file of this patent

UNITED STATES PATENTS

| 2,441,553 | Britton | May 18, 1948 |
|---|---|---|
| 2,556,888 | Smith | June 12, 1951 |
| 2,585,755 | Duspiva | Feb. 12, 1952 |
| 2,786,011 | Novak | Mar. 19, 1957 |

OTHER REFERENCES

"Carbopol 934," B. F. Goodrich Chemical Co. Service Bulletin GC–20, March 1954, pages 1, 2, 4 and 11.

Drug and Cosmetic Industry, vol. 77, No. 6, December 1955, page 745.